United States Patent [19]

Sasa

[11] Patent Number: 4,611,053

[45] Date of Patent: Sep. 9, 1986

[54] POLYHYDROXAMIDE POLYMER

[76] Inventor: Michiyuki (Mitch) Sasa, 166-5 Evergreen Ter., Carbondale, Ill. 62901

[21] Appl. No.: 702,082

[22] Filed: Feb. 15, 1985

[51] Int. Cl.$^4$ ...................... C08G 69/00; C08G 69/26
[52] U.S. Cl. .................................. 528/335; 525/329.4; 526/304
[58] Field of Search ........................ 528/335; 526/304; 525/329.4

[56] References Cited

U.S. PATENT DOCUMENTS 3,755,254  8/1973  Zellner ................................ 528/335

Primary Examiner—Harold D. Anderson
Attorney, Agent, or Firm—Mason, Fenwick & Lawrence

[57] ABSTRACT

A poly-N-hydroxamide polymer of the general structural formula:

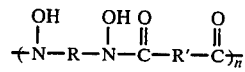

is prepared by reaction with a conventional diacid halide of a precursor having one of the general structural formula:

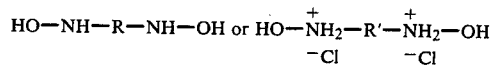

where R and R' are each divalent substituted or unsubstituted linking radicals, each containing 1 or more up to about 30 or more C atoms, and n is at least about 10.

7 Claims, No Drawings

POLYHYDROXAMIDE POLYMER

FIELD OF THE INVENTION

This invention relates to the field of polymers and is concerned more particularly with a novel poly-N-hydroxamide polymer in which recurrent N-hydroxyamide groups —CONOH— are connected together into a polymeric chain by divalent linking radicals.

BACKGROUND OF THE INVENTION

A tri-N-hydroxyamide-di-amide compound, identified by the name "Deferoxamine", is known to possess the following structural formula:

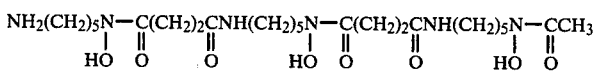

existing as monohydrate crystals having a melting point of 138°–140° C. and a solubility in water at room temperature of about 1.2%. According to Merck's Index, 10th edition, this compound is obtained from *Streptomyces pilosus* or, alternately, is prepared from Ferrioxamine B which is an iron complex acting as a natural microbial growth factor isolated according to U.S. Pat. Nos. 3,118,823 and 3,153,621 with the general formula $C_{25}H_{45}FeN_6O_8$. Deferoxamine has strong chelating properties for polyvalent metal ions, particularly for Fe(III) ions and less so for Fe(II) ions and is effective as an iron chelating agent for iron mobilization, and as an antidote for iron poisoning such as chronic iron poisoning caused by repeated blood transfusions in the treatment of Cooley's anemia.

It would be obviously desirable to have available a poly-N-hydroxamide having strong metal chelating properties comparable to those of Deferoxamine which can be prepared by a direct chemical reaction, as contrasted with isolation from complex natural materials, and particularly one that can be formed as a polymer in a variety of different structural shapes and with a broad range of physical properties, such as melting point, solvent solubility and the like. Similarly, a polyhydroxamide polymer has considerable potential for use as a chelating agent in the purification of water and other liquid media by the removal therefrom of heavy metal and alkaline earth metal ions.

It is, of course, well known to prepare nylon polyamide polymers by the condensation of an organic diamine with an organic diacid chloride and, inasmuch as the inventive polyhydroxamide polymers have a general analogy to nylon-type polyamides, a brief summary of the chemistry of nylon polymerization will be helpful to an understanding of the present invention.

Nylon, using the 6,6-polyamide as a convenient example, has the following structural formula:

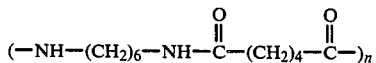

This polymer is formed by condensation polymerization and its precursors are hexamethylene diamine $(H_2N—(CH_2)_6—NH_2)$ and an adipoylhalide, such as adipoylchloride

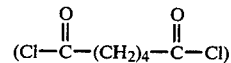

or adipoylester, such as methyl adipate

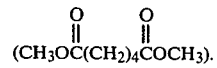

The condensation polymerization scheme for adipoylchloride is

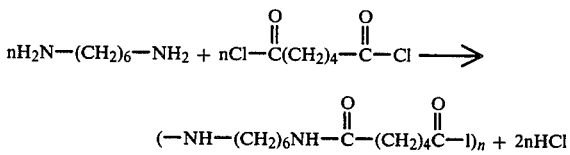

OBJECTS OF THE PRESENT INVENTION

The object of the present invention is to prepare a poly-N-hydroxamide polymer similar in principle to conventional nylon polyamides which contains in its polymeric chain recurrent N-hydroxyamide groups of the structural formula —CONOH— which are linked together by divalent linking radicals, preferably hydrocarbon chains, which are most commonly unsubstituted but can be substituted as well, the number of the carbon atoms in the linking radicals being capable of wide variation to permit corresponding variation in the number of hydroxyl groups carried on the polymeric molecule.

Another object of the invention is the preparation of poly-N-hydroxamide polymers by the condensation polymerization of an organic di-N-hydroxyamide compound with a conventional organic diacid chloride.

SUMMARY OF THE INVENTION

The poly-N-hydroxamide polymers of the present invention have the following general structural formula:

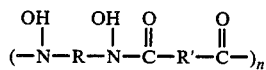

where R and R' are each a divalent linking radical which can contain from 1 to about 30 or more carbon atoms preferably in a chain, and n is the degree of polymerization of the polymer and has a value of at least about 10 and better somewhat higher, say at least about 20. R and R' can conveniently be any suitable linking radical that can be derived from an organic diamine and an organic diacid halide and is preferably composed of groups, such as alkylene, alkenylene, and alkynylene groups connected into chains or cycloalkylene and arylene groups alone or included in such chains, particularly preferred groups having the formula $-(CH_2)_y-$ where y ranges from 1 to about 20 or higher. In these groups, the substituents on the carbon atoms are preferably hydrogen atoms but one or more of them can also be a halogen atom or any alkyl, alkenyl, or alkynyl group or a cyclic form thereof or an aryl group. These polymers are prepared by the condensation polymerization of an organic di-N-hydroxylamine having the structural formula HONH—R—NHOH or the halogen salts thereof, such as the chloride having the formula:

$$\overset{+}{HO-NH_2}-R-\overset{+}{NH_2}-OH$$
$$\phantom{HO-}{}^-Cl\phantom{-R-}{}^-Cl$$

with a conventional organic diacid chloride having the structural formula Cl.CO—R'—CO—Cl.

DETAILED DESCRIPTION OF THE INVENTION

(1) Introduction

The di-N-hydroxyamines or their halide salts which serve as precursors for the instant poly-N-hydroxamide polymers are prepared by the amine-hydroxylamine conversion of an organic diamine. Inasmuch as the amine-hydroxylamine conversion reaction is generally known for organic monoamines, a description of the latter procedure will be given first and followed by a description of the same conversion reaction applied to an organic diamine as contemplated here. Finally, the condensation polymerization of the thus-prepared di-N-hydroxylamine precursors will be described which results in the polymers of the invention. In order to illustrate the broad variation in the linking radicals that can be present in each of the organic dihydroxylamine precursors as well as the conventional diacid chlorides in the present condensation polymerization, several different examples of the precursor preparation as well as the ultimate condensation polymerization will be given.

(2) Amine-Hydroxylamine Conversion Reaction for Monoamines

The reaction scheme to prepare a hydroxylamine from an amine of the general formula $RNH_2$, where R is any organic group is:

$$RNH_2 + \phi\overset{O}{\overset{\|}{C}}-O\overset{O}{\overset{\|}{C}}\phi \longrightarrow RNHO\overset{O}{\overset{\|}{C}}\phi + RN^+H_2O^-\overset{O}{\overset{\|}{C}}\phi$$

$$RNHO\overset{O}{\overset{\|}{C}}\phi \xrightarrow{HCl\,(gas)} R^+NH_2O\overset{O}{\overset{\|}{C}}\phi \xrightarrow{acid\,or\,base}$$
$$\phantom{RNHOC\phi \xrightarrow{HCl\,(gas)}}{}^-Cl$$

$$R^+NH_2OH \xrightarrow{-HCl} RNHOH$$
$$\phantom{R^+NH_2OH}{}^-Cl$$

The specific conditions for the reaction for producing, e.g., cyclohexyl hydroxylamine is as follows. Dibenzoylperoxide (12.1 g, 0.5 mol) is dissolved to 250 ml of absolute benzene in a 500 ml round bottom flask which is washed by acetone and fire dried. Then, cyclohexylamine (19.8 g, 0.2 mol) dissolved to 100 ml of absolute benzene is slowly poured into the dibenzoylperoxide-benzene solution through an addition funnel. The reaction is exothermic. Self-refluxing is continued for two hours with temperatures between 40°–65° C. The reaction mixture is cooled in an ice bath and the precipitated benzoyloxycyclohexylamine salt separated by suction filtration. The residue is put into a 100 ml erlenmeyer flask and HCl gas is passed therethrough. Benzoyloxycyclohexylamine hydrochloride (M.W. 225.5, M.P. 151°) precipitates (yield 75%). The purified precipitate (5.2 g, 0.2 mol) is dissolved to 100 ml of absolute ethanol in a 250 ml three-necked round bottom flask. Then, 20 ml of 6N NaOH solution is slowly added through an addition funnel and the mixture is kept in the steam bath for 30 minutes. Then 15 ml of distilled water with 1 ml of 6N HCl solution is added. The reaction mixture is cooled in an ice bath to crystalize cyclohexyl hydroxylamine hydrochloride. (M.W. 115, M.P. 136°). The crude product is purified by recrystalization in small amount of absolute ethanol (yield 92%).

(3) Amine-Hydroxylamine Conversion Reaction for Diamines

The application to the known amine-hydroxylamine conversion reaction to organic diamine can be illustrated by the synthesis of 1,6-di-N-hydroxylamino hexane according to the following reaction scheme:

$$NH_2(CH_2)_6NH_2(1) + \phi\overset{O}{\overset{\|}{C}}OO\overset{O}{\overset{\|}{C}}\phi \longrightarrow$$

$$\phi\overset{O}{\overset{\|}{C}}ONH(CH_2)_6NHO\overset{O}{\overset{\|}{C}}\phi(2) + \phi\overset{O}{\overset{\|}{C}}O^-N^+H_2(CH_2)_6N^+H_2{}^-O\overset{O}{\overset{\|}{C}}\phi$$

$$(2) \xrightleftharpoons[-HCl\,(NaHCO_3)]{HCl\,(gas)} \phi\overset{O}{\overset{\|}{C}}ON^+H_2(CH_2)_6N^+H_2O\overset{O}{\overset{\|}{C}}\phi \,(3)$$
$$\phantom{(2) \xrightleftharpoons[-HCl]{HCl\,(gas)} \phi COO}{}^-Cl\phantom{(CH_2)_6N^+H_2O}{}^-Cl$$

$$(3) \xrightarrow[(b)\,H_2O]{(a)\,acid\,or\,base} HON^+H_2(CH_2)_6N^+H_2OH(4)$$
$$\phantom{(3) \xrightarrow[(b)\,H_2O]{(a)\,acid\,or\,base}}{}^-Cl\phantom{(CH_2)_6N^+H_2}{}^-Cl$$

$$(NaHCO_3)$$

$$(4) \xrightarrow{-HCl} HONH(CH_2)_6NHOH(5)$$

(a) Preparation of $C_6$ Di-N-hydroxylamine

The specific laboratory procedure for carrying out the above reaction scheme is as follows. Benzoyloxy peroxide (24.2 g, 0.1 mol) is dissolved in 300 ml of absolute benzene. Then, 1,6-diaminohexane (1) (11.6 g, 0.1 mol) dissolved to 100 ml of absolute ether is added to the benzoyloxy peroxide-benzene solution dropwise. The reaction mixture is kept while stirring at 40°–50° C. for two hours. 100 ml of absolute ether is added and the resultant precipitate is separated. Then, dry HCl gas is passed through the solution to form 1,6-dibenzoyloxy amino hexane hydrochloride (3), (M.W. 429, M.P. 137°–138° C.), which is recrystallized in absolute ethanol (yield 45%). 1,6-dibenzoyloxy amino hexane (2) is formed by treating (3) with 10% $NaHCO_3$ solution. (M.W. 356, M.P. 70° C.). Then the purified product (3) (6.45 g, 0.015 mol) is dissolved in 200 ml of absolute ethanol. 150 ml of concentrated HCl solution is added slowly and the mixture refluxed for one and a half hour at 85° to 95° C. The refluxing is stopped and the reaction mixture cooled to about 30° C. using an ice bath. Then 150 ml of distilled water is added and stirred for another half hour at 30° C. The entire solvent is evaporated with a rotary evaporator. The residue is then dissolved into an isopropanol-ethylacetate mixture for crystallization. Further, recrystallization is carried out in the same solvent system. The resulting white powder-like crystal is 1,6-dihydroxylamino hexane hydrochloride (4) (M.W. 221, M.P. 135° C.). The yield is 56%. The free base form of (4), 1,6-dihydroxylamine hexane (5) can be obtained by treating (4) with mild base, such as NaHCO$_3$ solution.

(b) Preparation of C$_{12}$ Di-N-hydroxyamine

The reaction scheme for preparing di-N-hydroxylamine dodecane is the same as above except that the diamino hexane is replaced with diamino dodecane of the formula NH$_2$(CH$_2$)$_{12}$NH$_2$. The specific laboratory procedure is as follows: A solution of benzoyloxyperoxide (24.2 g, 0.1 mol) in 200 ml of absolute benzene is prepared. Then, a solution of 1,12-diaminododecane (20.0 g, 0.1 mol) and 200 ml of absolute tetrahydrofuran is added slowly. The reaction mixture is stirred for three hours at 35° C. Then 100 ml of absolute ether is added. A resultant white precipitate is separated by suction filtration, Then, dry HCl gas is passed through the solution. The resultant white precipitate is filtered and recrystalized in absolute ethanol as 1,12-dibenzoyloxyamino dodecane hydrochloride (M.W. 513, M.P. 110°-112° C.). The yield is 52%. The purified product (8) (5.13 g, 0.01 mol) is then dissolved in 150 ml of ethanol. Then 150 ml of concentrated HCl solution is slowly added. The reaction mixture is refluxed for four hours at 90° C. and stopped by the addition of 150 ml of distilled water, followed by stirring for two hours. The white precipitate that is formed is separated and washed with hot water three times. The washed white precipitate is then crystallized from an isopropanol-ethylacetate solution as 1,12-di-N-hydroxylamino dodecane hydrochloride (M.W. 305, M.P. 138°-139° C.). The yield is 56%. The crystalline product is then treated with a weak base such as sodium bicarbonate to form 1,12-di-N-hydroxylamino dodecane (M.W. 232, M.P. 93°-94°).

(3) Synthesis of the New Poly-N-hydroxamine Polymers

The polymers of the invention are formed by the condensation polymerization of the di-N-hydroxylamine precursor with any dibasic acid halide in the same general manner as nylons polyamides, viz:

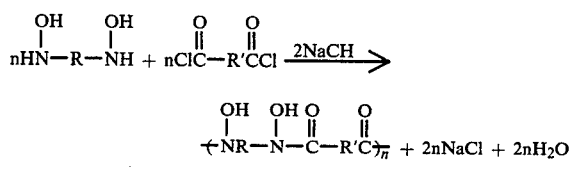

(a) Preparation of 6,6-Poly-N-hydroxamide

The preparation of 6,6-poly-N-hydroxamide from hexane di-N-hydroxylamine and adipoyl chloride, (CH$_2$)$_4$(COCl)$_2$, follows the above equation. The specific steps for this polymerization are as follows: Prepare a solution of 2.21 g (0.01 mol) of 1,6-dihydroxylamino hexane hydrochloride (M.W. 221, M.P. 142° C.) and 110 ml of water and 1.6 g of NaOH (0.042 mol). Place this solution into a mixer and stir for one minute. Prepare a solution of 1.16 g (1.02 ml, 0.01 mol) of adipoylchloride (M.W. 154) and 190 ml of carbon tetrachloride and add to the mixer. Immediately after adding, stir for five minutes and a precipitate forms. The precipitate is 6,6-polyhydroxamide (white, M.P. 95°-100°) which is filtered and washed twice with 100 ml portions of water. The polymer is then freeze-dried (yield 96%). Infrared spectra (KBr); 3400-3100 (NOH), 2940-2880 (C$_6$H$_{12}$), 1620 (C=O).

(b) Preparation of 6,10-Poly-N-hydroxamide

The adaptability of the polymerization to various dicarboxylic acids is shown by substituting sebacyl chloride, (CH$_2$)$_8$(COCl)$_2$ for adipoyl chloride in the above reaction. The details of the polymerization are as follows: Prepare a solution of 2.21 g (0.01 mol) of 1,6-di-N-hydroxylamino hexane hydrochloride and 110 ml of water and 1.68 g of NaOH (0.042 mol). Place this solution in the mixer and stir for one minute. Prepare a solution of 2.63 g (2.36 ml, 0.011 mol) of sebasylchloride (M.W. 239) and 190 ml of carbontetrachloride, then add into the mixer. Immediately after adding, stir for five minutes with the formation of a precipitate. The precipitate is 6,10-poly-N-hydroxamide (white, M.P. 120°-125°) which is then filtered and washed twice in 100 ml portions of water. The polymer is then freeze-dried (yield 92.35%). Infrared spectra (KBr): 3400-3100 (NOH), 2920-2860 (C$_{12}$H$_{24}$), 1640 (C=O).

(4) Preparation of 12,10-Poly-N-hydroxamide

Similarly, various di-N-hydroxylamines can be used in the polymerization as illustrated by using 1,12-di-N-hydroxylamine dodecane hydrochloride prepared as described above in the reaction. This polymerization proceeds as follows: Prepare a solution of 1,12-di-N-hydroxylamino dodecane hydrochloride (3.05 g, 0.01 mol) and 200 ml of water and 1.68 g of NaOH (0.042 mol). Place this solution mixture into the mixer and stir for five minutes. Prepare a solution of sebacylchloride (2.03 g, 2.39 ml, 0.011 mol) and 100 ml of carbontetrachloride, and then add to the mixer. Immediately after adding, stir the mixture for ten minutes, and 12,10-poly-N-hydroxamide is precipitated (brownish-white, M.P. 110°-115°). The precipitate is filtered and washed twice with 100 ml portions of water. Then the polymer is freeze-dried (yield 90%). Infrared spectra (KBr): 3550-3000 (N—OH), 2940-2850 (C$_{12}$H$_{24}$), 1690 (C=O).

| Solubility of Polymers | | | | | | | |
|---|---|---|---|---|---|---|---|
| Polymer | Water | Conc. Sulfuric Acid | Toluene | Pyridine | Phenol | m-Cresol | TMEDA |
| 6,6- | i | P | i | P | S | S | S |
| 6,10- | i | i | i | P | S | S | S |
| 12,10- | i | i | i | P | S | S | S | i = insoluble,
P = partially soluble,
S = soluble.

Demonstration of Chelating Activity of Poly-N-hydroxamide Polymers

The effectiveness of the inventive polymers for chelating polyvalent metal ions, such as Fe(III) ions, is demonstrated by the following comparative test.

First, N-cyclohexylacetylhydroxyamide, a known mono-N-hydroxamide selected as a control for comparison purposes, was prepared in a test tube by mixing equimolar portions of hydroxylaminocyclohexane (in distilled water) and acetic anhydride (in carbon tetrachloride). The prepared control product (0.1 g) was separated and dissolved in 2 ml of hot distilled water in another test tube. As a few drops of 5% ferric chloride ($Fe_2Cl_5$) solution was added, N-cyclohexylacetylhydroxamide changed color to purplish brown. Next, about 0.1 g of each of 6,6-, 6,10- and 12,10- poly-N-hydroxamide polymers prepared above was dissolved in 2 ml of hot tetramethylethylenediamine (TMEDA) in separate test tubes. A few drops of 5% ferric chloride solution were added. The solutions of each polymer in TMEDA immediately changed to dark reddish brown. These results indicate that these polymers have chelating ability.

(5) General

The present polymers, as the above preparation descriptions show, are readily polymerized by an interfacial polymerization technique. For interfacial polymerization, the respective reactants are dissolved in immiscible solvent media, and when such solutions are brought into contact, polymerization occurs at the interface therebetween. When the solvent solutions are mildly stirred together, as in the above preparations, the solidified or precipitated polymer tends to collect or accumulate into a kind of ball. On the other hand, if the solvent interface is kept quiescent, the polymer polymerizes at that interface into a film which upon removal from the reaction vessel, is readily flexible and exhibits some tenacity when stretched with a certain force by hand. With increased reaction time under quiescent conditions, the thickness of the film increases to give a more sheet-like form. Upon more vigorous agitation, polymerization occurs at the surface of the dispersed phase globules producing bead-like polymerization products. Naturally, the recovered polymers can be melted by heating above their melting points and thereby cast into virtually any desired shape, including blocks, sheets, films and so on. If one reactant solution is introduced into the other through a small orifice or spinneret, the polymer can be collected in the form of a string or filament; alternatively, the molten polymer, or solvent solution thereof, can be extruded into generally filament form.

The greater the number of carbon atoms in the present polymers, the more likely such polymers are to exhibit brittleness and vice versa. Similarly, the present polymers when freeze dried tend to become more hard and brittle which is believed to be due to a hydrogen bonding effect within the polymer molecule.

The reaction conversion values achieved in the above described polymerization indicate that the resultant polymers have a degree of polymerization (n) of at least about 10 and for the higher conversion rates, at least 20 or above which corresponds to a polymer molecular weight in the range of about 1500–3000 or higher. It should be noted that these conversion values were achieved under the simplest reaction conditions without the application of any conditions or measures that would be calculated to promote the reaction and thus achieve polymers of higher molecular weight. By the application, for example, of heating, a flowing nitrogen atmosphere and a vacuum, as are well known for the production of so-called nylon "super" polymers, much higher molecular weights could presumably be readily achieved. Polymerization techniques, other than interfacial, that have been useful for nylon polymers can also be employed to good advantage here.

As anyone familiar with the field of nylon polyamides is aware, the organic moieties in the reactants of the present polymers, i.e., the organic di-N-hydroxylamine and the organic diacid chloride (corresponding to R and R' in the original general equation) are subject to very wide variation and are at least in principle virtually unlimited. Preferably, the organic moieties are hydrocarbon chains constituted conveniently of repeating simple hydrocarbon units, alone or united into a chain, and ranging in length from about 1 to about 30 carbon atoms, exclusive of the amido carbon atoms, although even higher length chains are conceivably possible where starting reactants containing the same can be practically synthesized. Typical and preferred examples of groups which can serve as the organic moieties of the present polymers can be listed as follows:

$$-(CH_2)_x-$$
$$-(CH=CH)_x-$$
$$-(C\equiv C)_x-$$

$$-(CH-CH)_x-$$
$$(CH_2)_y$$

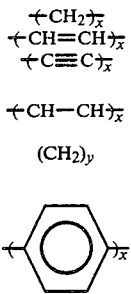

where y is an integer of at least one and suitable to form a cycloalkyl radical and x in each instance is an integer of at least one and sufficient to give a total number of carbon atoms in each linking radical of 1 to about 30 or so.

Obviously, these individual groups can be multiplied to form the connective chains between the N-hydroxamide groups of the instant polymers or they can be combined together into combination chains. Further, the possibility exists for the introduction of other groups than hydrocarbons into the connecting or linking radicals R and R' for the N-hydroxamido groups and in this connection mention can be made of such groups as —CO—, —COH—, —NCH$_3$—, and so on and heterocyclic groups could also be incorporated into these connecting or linking radicals as have been employed in some of the newer polyamides and polyamide-imides. Where the linking or connecting radicals are constituted of one or more carbon atoms joined together, these carbon atoms typically carry hydrogen atoms but one or more of the hydrogen atoms can under appropriate circumstances be replaced with other atoms or groups such as halogen atoms or any of the groups in monovalent form listed above; namely, alkyl, aklenyl, alkynyl, cycloalkyl or aryl groups. Thus, it will be seen that the bivalent connecting or linking radicals present between the N-hydroxamido groups of the present polymers can be of widely different structures within the broad scope of the present invention.

While the invention has been described with reference to organic di-N-hydroxylamines and organic diacid halides, N-polyamines and polyacids containing more than two N-amino or carboxylic acid groups can, of course, be used if desired to achieve cross-linked rather than linear polymers. Likewise, the di- or polybasic acidic reactant can take the form of the corresponding carboxylic acid ester instead of the halide. Both of these variations are recognized in polyamide manufacture and others of a similar status can also be adopted.

What is claimed is:

1. A polymer containing at least 10 recurrent

groups connected by substituted or unsubstituted divalent linking radicals.

2. The polymer of claim 1, wherein said linking radicals contain up to about 30 carbon atoms.

3. A polyhydroxamide polymer of the general formula

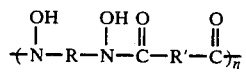

where R and R' are divalent connecting radicals with R being derived from an organic poly-N-hydroxyamine and R' from an organic polycarboxylic acid halide and n has an average value of at least about 10.

4. The polymer of claim 3, wherein R and R' are each an alkylene radical of the structure $-(CH_2)_z-$ where z ranges from one to about 30.

5. The polymer of claim 2 wherein said linking radicals contain up to about 20 carbon atoms.

6. The polymer of claim 3 wherein said connecting radicals are derived from an organic di-N-hydroxyamine and an organic dicarboxylic acid, halide or ester.

7. The polymer of claim 4 wherein z ranges from about 1 to about 20.

* * * * *